United States Patent [19]

Birnbaum et al.

[11] Patent Number: 4,669,831
[45] Date of Patent: Jun. 2, 1987

[54] TOTAL INTERNAL REFLECTION MODULATOR/DEFLECTOR

[75] Inventors: Milton Birnbaum, Rancho Palos Verdes, Calif.; Armin W. Tucker, deceased, late of Bellflower, Calif., by Marsha A. Tucker, legal representative

[73] Assignee: The United States of America as represented by the Secretary of the Air Force, Washington, D.C.

[21] Appl. No.: 726,872

[22] Filed: Apr. 22, 1985

Related U.S. Application Data

[63] Continuation-in-part of Ser. No. 439,471, Nov. 5, 1982, abandoned.

[51] Int. Cl.[4] .............................. G02F 1/29; G02F 1/19
[52] U.S. Cl. ....................................... 350/381; 350/393
[58] Field of Search ........................ 350/381–383, 350/385, 394, 356, 363, 352, 355, 359

[56] References Cited

U.S. PATENT DOCUMENTS

| | | | |
|---|---|---|---|
| 3,458,247 | 7/1969 | Buhrer et al. | 350/383 |
| 3,539,244 | 11/1970 | Marks | 350/160 |
| 4,097,122 | 6/1978 | McNaney | 350/353 |
| 4,181,399 | 1/1980 | McMahon et al. | 350/96.14 |
| 4,196,977 | 4/1980 | Scibor-Rylski | 350/356 |
| 4,249,796 | 2/1981 | Sincerbox et al. | 350/370 |
| 4,262,993 | 4/1981 | Burns et al. | 350/96.14 |

OTHER PUBLICATIONS

Gavrilidis et al., "A Total Internal Reflection Modulator Using Small Glancing Light Angles", J. Phys. D: App. Phys., vol. 11, No. 78, pp. 1441–1444.
Riesz et al., "Gigahertz Optical Modulation", App. Optics, vol. 8, 7-1969, pp. 1393–1396.
Lee et al., "Light Beam Deflection with Electrooptic Prisms", IEEE Jr. Quantum Electronics, vol. QE-4, 1968, pp. 442–452.
Chen, F. S., "Modulators for Optical Communications", Proc. IEEE, vol. 58, 10-1970, pp. 1440–1457.
Denton et al, "Lithium Tantalate Light Modulators", Jr. of App. Physics, vol. 38, 3-1967, pp. 1611–1617.
Nishiwaki et al, "The DC Characteristics of the Periodic Skin-Field-Electrooptic Light Modulator", IEEE Jr. of Quantum Electronics, vol. QE-9, 6-1973, pp. 559–563.

*Primary Examiner*—William H. Punter
*Attorney, Agent, or Firm*—Stanton E. Collier; Donald J. Singer

[57] ABSTRACT

A total internal reflection modulator/deflector assembly for use with a focused beam of polarized incident laser light. The application of a low direct current voltage (e.g., less than 50 volts) to a pair of identical stacked crystals exhibiting the Pockel's effect produces an index of refraction difference at their interface. Since the index changes are small, the incidence angle of the impinging polarized laser light is large, e.g., 89 degrees. In the preferred embodiment, one crystal is rotated relative to the other, such that the applied electric field causes index changes of $+\Delta n$ in one crystal and of $-\Delta n$ in the other crystal. As a result, the impinging polarized laser light is divided into two portions, one of which is totally internal reflected, and transmitted in the desired modulated conditions. Two electrode members are used to apply the low direct current voltage to the interface of the crystals, with the electrodes arranged to face each other across the crystals and also positioned such that the incident light need not traverse them, the other portion is refracted.

2 Claims, 2 Drawing Figures

TOTAL INTERNAL REFLECTION MODULATOR/DEFLECTOR

STATEMENT OF GOVERNMENT INTEREST

The invention described herein may be manufactured and used by or for the Government for governmental purposes without the payment of any royalty thereon.

BACKGROUND OF THE INVENTION

This is a continuation-in-part of Application Ser. No. 439,471, filed Nov. 5, 1982, and now abandoned.

This invention relates to total internal reflection (hereinafter referred to as TIR) modulators and deflectors and more particularly to a TIR modulator/reflector assembly for use with polarized light at the optical and infrared wavelengths.

In many applications (such as laser communications, laser data processing, and laser computer uses) high speed, low voltage, and efficient laser light modulators and light deflectors are required. In this regard, although modulator/reflector components are only one constituent of space laser communication links, their performance has limited the high data rate capabilities to approximately one gigabit (hereinafter referred to as Gbs which equals $10^9$ bits per second) of space laser communications system.

It is to be noted that the requirements for space operation (such as efficiency, reliability, size and weight, power consumption, and voltage requirements) severely limit the choices of a modulator/reflector (hereinafter referred to as a modulator). It is also to be noted that only a few lasers have been developed to the point that they can be considered for space development and, consequently, modulators have been developed only for use with those lasers.

Accordingly, it is fair and accurate to state that what is needed in the art and is not available is a laser beam modulator for use at Gbs data rates (and higher) in space operations generally, as distinguished from limited use only as a component of a particular space laser communications system.

SUMMARY OF THE INVENTION

The instant invention fulfills the aforementioned need and thereby constitutes a significant advance in the state-of-the-art.

According to the instant invention, there is provided a TIR modulator assembly for use with an incident polarized laser light beam of a wavelength in the range of from visible light to, and including, near infrared. The preferred embodiment of the inventive TIR modulator assembly includes two identically shaped crystal members which are made of the same material that is optically transparent to the beam of polarized laser light and which exhibits Pockel's effect, with the two crystals arranged in abutting optical contact to form an interface, and with one crystal rotated relative to another in a unique structural manner that will be discussed later herein. The preferred embodiment of the TIR modulator also includes at least two electrodes which are in contact with both crystals at the interface thereof, which are positioned in an oppositely disposed fashion, and which are arranged such that the incident laser beam need not traverse them. The application of a low direct current voltage (e.g., less than 50 volts) to the two crystals by way of the electrodes, which are connected to a d.c. voltage source, produces an index of refraction difference at the interface which, in turn, causes the wanted TIR effect (and the deflection) of one portion of the incident polarized laser light beam and results in the transmission of that deflected portion of the laser light beam in the desired modulated condition. Of course, the other portion of the incident laser beam is refracted and transmitted without being totally internally reflected and/or modulated.

Therefore, it is an object of the instant invention to provide a modulator for a beam of polarized laser light.

It is another object of this invention to provide such a modulator for a polarized laser light beam having a wavelength which is a wavelength in the range of from visible light to, and including, near infrared.

It is a further object of this invention to provide such a modulator that is useable in many applications including, but not limited to, laser communications, laser data processing, laser computer operations, and space communication systems.

It is yet another object of the instant invention to provide such a modulator which can be used where high speed, low voltage, high efficiency, great reliability, small size, and light weight are preferred or required.

It is still another object of this invention to provide such a modulator in which the principle of total internal reflection is applied to modulate and transmit a laser light beam.

It is a still further object of the instant invention to provide such a modulator in which constituent materials which exhibit Pockel's effect are used to attain modulation.

These objects of the instant invention, as well as other objects related thereto, will become readily apparent to a person of ordinary skill in the art after a consideration of the description of the instant invention, coupled with reference to the contents of the Figures of the drawing.

DETAILED DESCRIPTION OF THE PREFERRED EMBODIMENT

Figure 1:
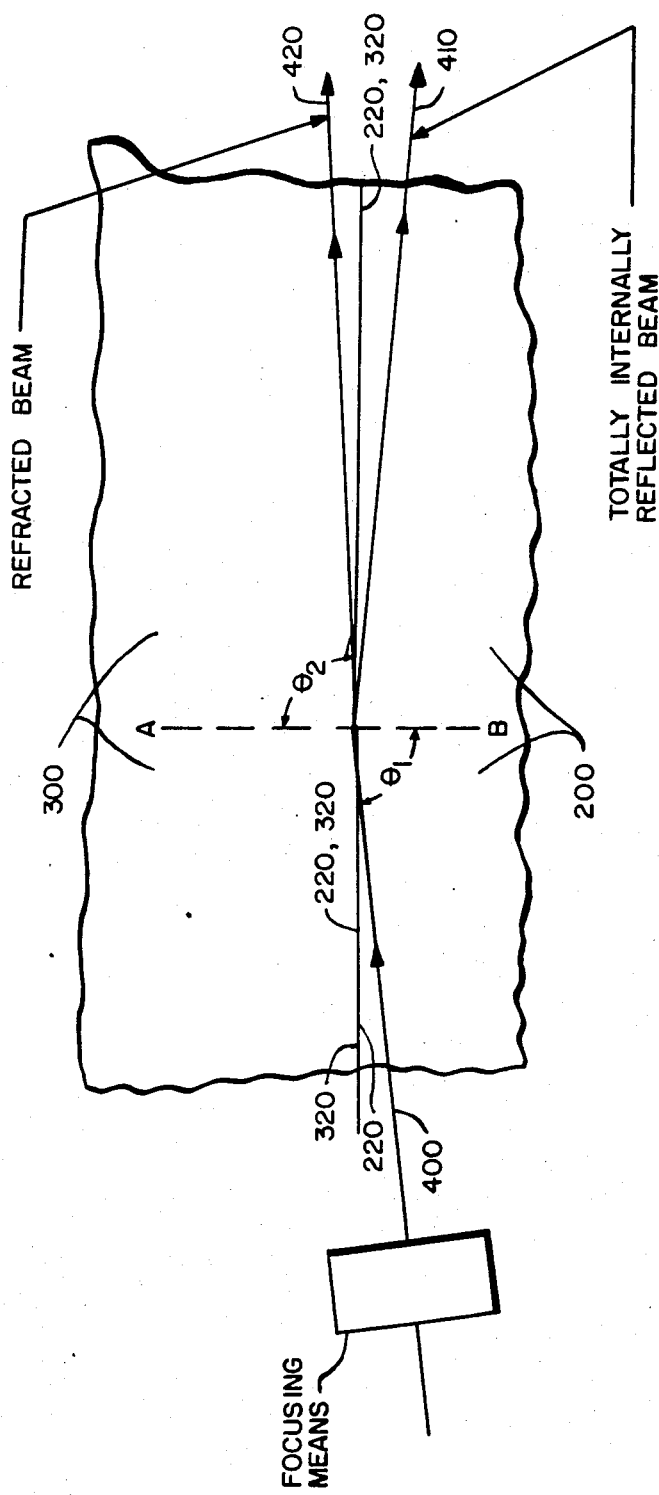
FIG. 1 is a diagrammatic representation of the phenomenon which is the physical basis of total internal reflection at the interface between two optically transparent media where the indices of refraction are different.

With reference to FIG. 1, therein are shown crystals 200 and 300, with crystal 200 having a surface 220 which is in optical contact with surface 320 of crystal 300, thereby forming interface 220, 320. Line A-B is a normal to the interface 220, 320, the incident and refracted angles, respectively, are $\theta_1$ and $\theta_2$. The physical basis for TIR of a beam of light (such as 400) at the interface 220, 320 between two optically transparent media, such as crystals 200 and 300, where the index of refraction of crystal 200 is $n_1$ and the index of refraction of crystal 300 is $n_2$, with $n_1$ being greater than $n_2$, is given by Snell's Law. When $\theta_2 = \pi/2$, $\sin\theta_1 = n_2/n_1$. For $\theta_1 > \sin^{-1} n_2/n_1 = \theta_c =$ critical angle, i.e., $\pi/2 > \theta_1 > \sin^{-1} n_2/n_1 = \theta_c$, total internal reflection (TIR) occurs. This is diagrammatically shown in FIG. 1.

Figure 2:
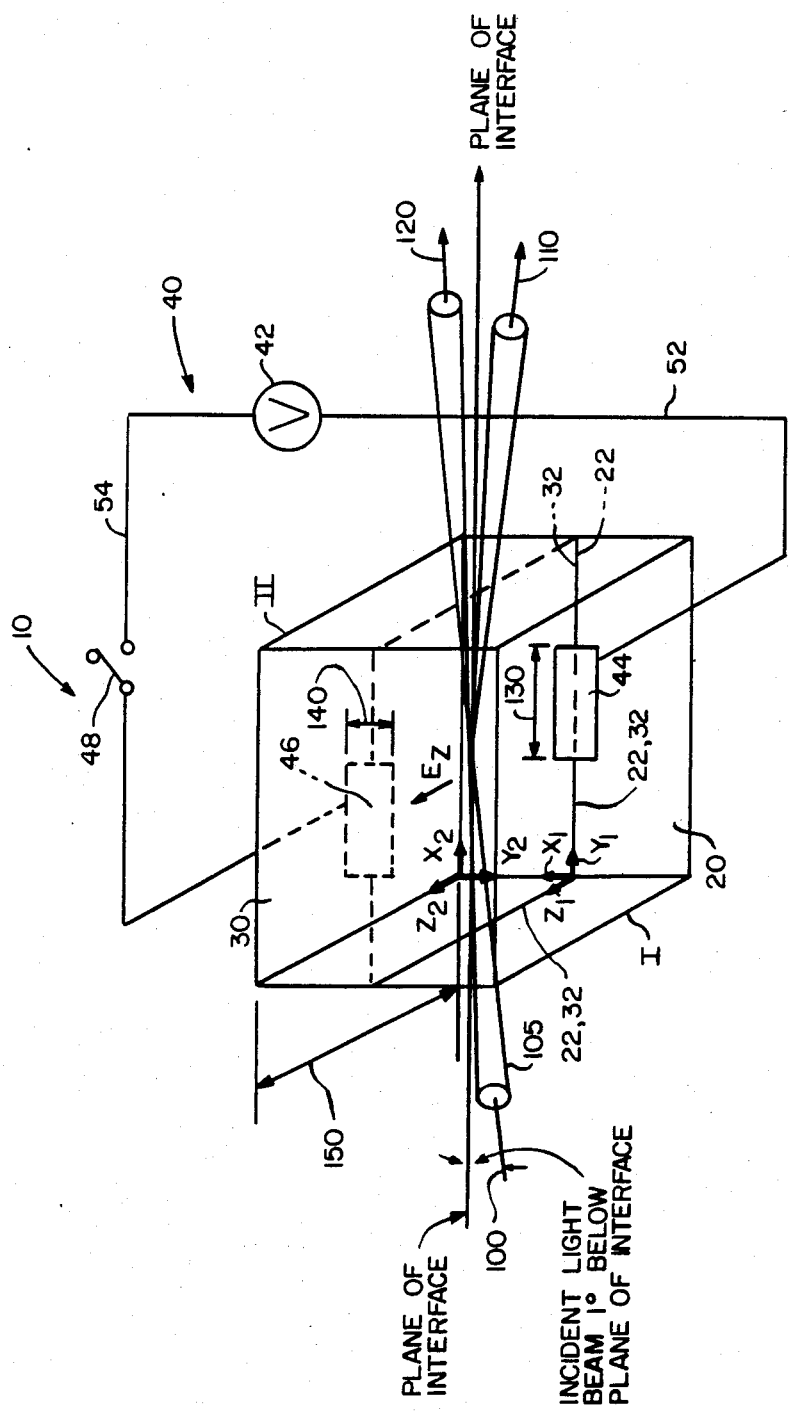
FIG. 2 is a perspective view in simplified schematic and pictorial form of the preferred embodiment of the instant invention.

The application of a low direct current voltage to the two crystals by way of electrodes 44 and 46, FIG. 2 produces an index of refraction difference at the interface of the two crystals. This index of refraction difference causes the wanted TIR effect (and the deflection 410) of one portion of the incident polarized laser light beam and results in the transmission of that deflected portion 410 in the desired modulated condition. The other portion 420 of the incident laser beam 400 is refracted and transmitted without being totally internally reflected or modulated.

In the instant invention it is taught that the application of a low direct current voltage to two identically configured crystals which are made of the same material, which exhibit Pockel's effect, which are uniquely oriented, and which are in optical contact, thereby forming an interface (similar to that shown in FIG. 1), will produce an index of refraction difference at the interface, with this induced difference causing the TIR (such as is shown in FIG. 1) of a portion of a beam of incident polarized light. It is here to be noted that, because the induced index of refraction changes (and the difference therebetween) at the interface of the two crystals will be relatively small, the incident and refracted angles (similar to incidence angles $\theta_1$ and $\theta_2$ in FIG. 1) must be large, e.g., 89 degrees.

With reference to FIG. 2, therein is shown, in simplified form, the preferred embodiment 10 of the instant invention, i.e., a TIR modulator assembly for use with a beam of incident polarized light (such as 100), with the polarized light 100 having a wavelength which is a wavelength in the range of from visible light to, and including, near infrared (such as a beam of polarized laser light).

In its most basic and generic structural form, the preferred embodiment 10 of the instant invention comprises: a first crystal member 20 which is made of material that is optically transparent to light in the visible/near infrared wavelength regions and exhibits Pockel's effect, and which has common (i.e., coincident) crystallographic and index ellipsoid axes $X_1$, $Y_1$, and $Z_1$, with this crystal member 20 oriented such that the beam of incident polarized light 100 is propagated along the $Y_1$ axis; a second crystal member 30 which is identical in configuration with first crystal member 20, which is made of the same material as the first crystal member 20, which has common (i.e., coincident) crystallographic and index ellipsoid axes $X_2$, $Y_2$, and $Z_2$, which is in optical contact with the first crystal member 20 such that interface 22, 32 is formed between the abutting surfaces 22 and 32 of respectively crystals 20 and 30, and with this crystal member 30 disposed such that the common axes of this crystal member 30 are rotated 90 degrees with respect to the common axes of the first crystal member 20, and also with the $Z_1$ axis of crystal member 20 and the $Z_2$ axis of crystal member 30 oriented such that they are in the same direction; means (generally designated 40) for selectively applying a predetermined low voltage to both crystal members 20 and 30 along the interface 22, 32; and means for selectively focusing laser beam 105 on interface 22, 32.

As previously stated, the two crystal members 20 and 30 are made of the same material having the characteristics hereinbefore described. Among the material preferred for making crystal members 20 and 30 are potassium deuterium phosphate (KD*P), or cadmium telluride (CdTe), or ammonium dihydrogen phosphate (ADP), or potassium dihydrogen phosphate (KDP).

As can be seen in FIG. 2, the means 40 for selectively applying a predetermined low voltage to both crystal members 20 and 30 along their interface 22, 32 includes: a source of direct current voltage 42; a first electrode member 44 and a second electrode member 46 in electrical connection (such as by wire leads 52 and 54) with the source of d.c. voltage 42; and, a switch 48 interposed between, and in electrical connection with, the source of d.c. voltage 42 and at least one of the two electrodes (such as 46), by way of electrical interconnecting wires 52 and 54. It is to be noted that the electrodes members 44 and 46 are in contact with the crystal members 20 and 30 at their interface 22, 32. The electrode members 44 and 46 are arranged in an oppositely disposed position (i.e., facng each other), and are positioned such that the incident beam of polarized light 100 does not traverse the electrode members 44 and 46.

However, it will be of interest to those of ordinary skill in the art to know that where KD*P crystal members are used in the instant invention, and a beam of polarized incident light at 546 microns is used, the incidence angle (i.e., the critical angle) needed is 89 degrees, and the d.c. switching or modulation voltage needed is about 28 volts. When CdTe crystal members are used in the instant invention, and a beam of polarized incident light at 10.6 microns is used, the d.c. modulation voltage needed is about 33 volts.

It is to be remembered that crystal members 20 and 30 are stacked and oriented as described above, and that they are made of the same crystal material having characteristics which include exhibiting the Pockel's effect. That effect, briefly stated, is that in crystals of the type such as 20 and 30 the refractive properties are changed by the application of an electric field.

More specifically, and with regard to the preferred embodiment 10, FIG. 2, it is to be noted that, in the absence of an applied electric field when a laser beam is propagating along axis $Y_1$ of crystal member 20 and reaches the interface 22, 32 it perceives no change in index of refraction and continues across the interface 22, 32, propagating along axis $X_2$ of crystal member 30. However, when voltage is applied to crystal members 20 and 30 at and near the interface 22, 32, the index of refraction n of crystal 20 changes at and near the interface 22, 32 to $n + \Delta n$. Likewise, and simultaneously, the index of refraction n of crystal member 30 (which is made of the same material as crystal member 20, and also is of the same configuration) changes at or near the interface 22, 32 to $n - \Delta n$. As a result, an index of refraction difference is produced at the interface 22, 32, thereby causing total internal reflection and deflection of light portion 110, FIG. 2, of laser light beam 100, and transmission of that portion 110 through crystal member 20 in the desired modulated (i.e., switched) condition. The other portion 120 of the beam 100 is refracted and transmitted through crystal member 30 without being either totally internally reflected and/or modulated.

Still referring to FIG. 2, when an electric field $E_z$ is applied along the crystallographic c-axis (optic axis), the optical indicatrix becomes $$\left(\frac{X}{n_o}\right)^2 + \left(\frac{Y}{n_o}\right)^2 + \left(\frac{Z}{n_e}\right)^2 + 2 r_{63} E_z XY = 1 \qquad (1)$$

where $n_o$ = ordinary and $n_e$ = the extraordinary index of refraction. By rotating the coordinates 45° about the Z-axis, Eq. (1) is diagonalized resulting in $$\frac{X_1^2}{(n_o + \Delta n)^2} + \frac{Y_1^2}{(n_o - \Delta n)^2} + \frac{Z_1^2}{n_e^2} = 1 \quad (2)$$

$$\Delta n = \frac{n_o^3}{2} r_{63} E_z$$

This arrangement is desirable because laser beam 105 is not required to traverse conductive transparent electrodes 44 and 46 such as may be required in other arrangements.

As to the geometry of FIG. 2: (1) in the absence of an applied voltage, a laser beam 105 propagating along $Y_1$, and polarized along $X_1$ in crystal I, 20, upon reaching the interface (I-II), 22, 32, perceives no change in index and continues across the boundary propagating along $X_2$ and polarized along $Y_2$, (2) when a voltage is applied along the Z axis in crystal I, 20, and II, 30, near interface 22, 32 the index in crystal I, 20, is ($n_o+\Delta n$) and in crystal II, 30, is ($n_o-\Delta n$). The critical angle is $$\sin\theta_c = \frac{n_o - \frac{n_o^3}{2} r_{63} E_z}{n_o + \frac{n_o^3}{2} r_{63} E_z} \simeq 1 = n_o^2 r_{63} E_z, \text{ and} \quad (3)$$

the voltage applied for switching is given by the following:

$$V = [d_o(1-\sin\theta_c)/n_o^2] r_{63} \quad (4)$$

$$E_z = v/d_o = [(1-\sin\theta_c)/n_o^2] r_{63} \quad (5)$$

In order that this invention extend the state-of-the-art, it is critically important that this invention operate at low voltage and at very high rates (for Gbit modulation rate). Low voltage operation requires that the distance between electrodes 44 and 46, be minimal. Also, the area of the footprint of focused laser beam 105 at interface 22, 32 must be minimized. In addition, the electrode area, must be kept as small as possible to achieve the low capacitance necessary for high modulation rates.

The electrode area is equal to its height, $d_c$, by it width, $L_s$. In FIG. 2, $d_c$ is indicated by item 140 and $L_s$ is indicated by item 130.

If laser beam 105 has a diameter of D, the diameter, $D_o$, of the focused laser beam at interface 22, 32 is given by $$D_o = \frac{4\lambda}{\pi} \frac{F}{D} \quad (6)$$

where F is the focal length of the focusing lens and $\lambda$ is the wavelength of the laser. The footprint formed upon interface 22, 32 is given by $$L_s = D_o/\sin\theta_c \quad (7)$$

where it is assumed that the width, $L_s$ 130, of electrodes 44 and 46 is about equal to the footprint. This clearly minimizes capacitance since the area of electrodes 44 and 46 are minimized as a result.

By using the above information one is thus able to obtain the switching voltage. For example, in KD*P, a voltage of 28 volts is possible when $\lambda = 546$ nm,
$n_o = 1.51$, $r_{63} = 24 \times 10^{-10}$ cm/V, $\theta_c = 89$ degrees, $d_o = 10$ nm, and $E_z = 2.78 \times 10^4$ V/cm.

With existing electronic circuits, modulation rates of 500- 1000 MHz are immediately available. The voltage required can be further reduced by tighter focusing. The capacitance can be reduced by decreasing "$d_c$". In principle, a $d_c$ of $20\lambda$ (or $10\lambda$ on each side of the boundary) is more than ample. This is 1/20 of the $d_c$ used in the above example indicating a 20 fold decrease in capacitance. This would readily permit operation at 10 GHz.

Focusing the radiation results in a cone of incidence angles (larger than the spread due to diffraction of the $TEM_{00}$ mode laser beam). Thus, not all the incident light will be modulated or deflected. This remedy is to increase the voltage, thus deflecting radiation at the largest incidence angles or to accept the loss in power of the modulated beam. With the 10 cm lens, the fraction of power not modulated is less than 1% and can be neglected.

A device along the above lines can be fabricated using $LiTaO_3$. However, the electro-optic coefficient is about 25% greater than that of KD*P and only a modest improvement in performance can be realized.

At $CO_2$ laser wavelengths (10.6 um), the TIR modulators will provide at least an order of magnitude improvement in modulation rates permitting direct operation in the $10^{10}$ Hz range and at lower voltages than are used in conventional polarization rotator modulators.

Another embodiment considered uses CdTe which has a large electro-optic coefficient, $r_{63}$, at 10.6 nm, of $6.8 \times 10^{-10}$ cm/V. A modulation voltage of about 33 volts results.

Following the analysis given above for visible TIR modulators it follows that some of the incident light would not be modulated because of the cone of incidence angles resulting from the use of a focusing lens. This loss is computed to be small and is negligible in most applications.

In communication applications, we are usually considering a laser transmitter of average power of approximately 1 W. However, the use of focusing optics requires consideration of the damage threshold for the electro-optic materials such as KD*P and CdTe.

For 10.6 nm, surface damage and bulk damage values of 350 and 460 MW/cm² have been observed for CdSe. The footprint intensity at interface 22, 32 for a 5 cm lens (1 W $CO_2$ laser beam) is approximately 29 KW/cm². Thus, the likelihood of laser damage can be considered practically negligible. For the focused 530 nm radiation (1 W, 10 cm lens) the footprint intensity is approximately 250 KW/cm². For the mode-locked pulses of 530 nm radiation peak intensities of 250 MW/cm² can be anticipated. However, the bulk damage thresholds in KD*P have been observed at intensities of $10^{12}$ W/cm². Consequently, damage effects should not occur at the power levels to be utilized in the TIR modulator and deflectors.

It is to be noted that, although there have been described and shown the fundamental and unique features of the instant invention, as applied to a preferred embodiment 10, nevertheless various other embodiments, variations, adaptations, substitutions, additions, and the like may occur to and can be made by those of ordinary skill in the art.

What is claimed is:

1. A total internal reflection modulator/deflector assembly operable at least near a gigabit switching rate, for use with a beam of polarized incident light in the visible/near infrared wavelength regions, said assembly comprising:
   a. a first crystal member made of material optically transparent to polarized light in the visible/near infrared wavelength regions, wherein said crystal member exhibits Pockel's effect, and wherein said crystal has common crystallographic and index ellipsoid axes $X_1$, $Y_1$, and $Z_1$, with this crystal member oriented such that a beam of said polarized incident light is propagated along said $Y_1$ axis;
   b. a second crystal member made of the same material as said first crystal member, wherein the crystal member exhibits Pockel's effect and is configured identically with said first crystal member, and wherein this crystal member has common crystallographic and index ellipsoid axes $X_2, Y_2$, and $Z_2$, and also wherein this crystal is stacked on and is in optical contact with said first crystal member, whereby an interface is formed between said first and second crystal member, and wherein this crystal member is disposed such that its $X_2$ and $Y_2$ axes are in a rotated 90 degrees position with respect to the $X_1$ and $Y_1$ axes of said first crystal member, with said $Z_2$ axis of this crystal member and said $Z_1$ axis of said first crystal member being in the same direction;
   c. means for selectively applying a predetermined low direct current voltage along said interface said means for selectively applying including:
   (1) a source of low direct current voltage;
   (2) a first electrode member and a second electrode member in electrical connection with said source of low direct current voltage, said first and second electrode members in contact with said first and second crystal members at said interface of said crystal members, said first and second electrode members arranged in an oppositely disposed fashion, said footprint of said beam being between said electrodes and the area of said electrodes being minimized to obtain said gigabit switching rate at a low operating voltage; and
   (3) a switch interposed between, and in electrical connection with, said source of low direct current voltage and at least one of said electrode member; and
   d. means for focusing said beam of polarized incident light onto said interface between said first and said second crystal members, said beam being incident on said interface at an angle substantially near a critical angle, said beam being focused to form a footprint having an optically minimum area on said interface within an electrical field established by said means for selectively applying a predetermined low direct current switching voltage;
   whereby, when voltage from said voltage applying means is applied to said crystal member along said interface thereof, a step change of the index of refraction of each said crystal member is caused at said interface, with said step change of one said crystal being a positive incremental step change and with said step change of said other crystal being an identical negative incremental step change, whereby an index of refraction difference is produced at said interface; and
   thereby said index of refraction difference at said interface cause refraction of one portion of said beam of incident polarized light and total internal reflection of a remaining portion of said beam of incident polarized light, said remaining portion being reflected and thus modulated.

2. A total internal reflection modulator/reflector, as set forth in claim 1, wherein said predetermined low direct current voltage of said means for selectively applying a predetermined low direct current voltage along said interface of said first and second crystal members is less than about 50 volts.

* * * * *